United States Patent [19]

Kuwata et al.

[11] Patent Number: 4,673,583
[45] Date of Patent: Jun. 16, 1987

[54] METHOD OF PRODUCING CALCIUM-ENRICHED ASEPTIC SOY BEAN CURD

[75] Inventors: Tamotsu Kuwata, Tokorozawa; Yutaka Suginaka, Saitama; Hideo Ohtomo, Higashimurayama, all of Japan

[73] Assignee: Meiji Milk Products Co., Ltd., Tokyo, Japan

[21] Appl. No.: 831,529

[22] Filed: Feb. 21, 1986

[30] Foreign Application Priority Data

Feb. 21, 1985 [JP] Japan ............................... 60-031554
Apr. 3, 1985 [JP] Japan ............................... 60-069105

[51] Int. Cl.$^4$ .......................... A23J 3/00; A23L 1/20
[52] U.S. Cl. .................................... 426/573; 426/401; 426/634
[58] Field of Search ............... 426/634, 322, 629, 74, 426/399, 401, 656, 573, 582

[56] References Cited

U.S. PATENT DOCUMENTS

| | | | |
|---|---|---|---|
| 4,427,710 | 1/1984 | Terada et al. | 426/634 |
| 4,514,433 | 4/1985 | Matsuura | 426/634 |

FOREIGN PATENT DOCUMENTS

| | | | |
|---|---|---|---|
| 0044770 | 1/1969 | Japan | 426/634 |
| 0061969 | 5/1981 | Japan | 426/634 |
| 0033020 | 7/1982 | Japan | 426/634 |
| 0126750 | 7/1983 | Japan | 426/634 |

Primary Examiner—Raymond N. Jones
Assistant Examiner—Marianne M. Cintins

[57] ABSTRACT

A method of producing an aseptic calcium-enriched soy bean curd is disclosed. The method includes the steps of adding a calcium hydroxide-sucrose complex as coagulant to the soy bean milk, sterilizing the resulting mixture by heating, adjusting the pH value of the sterilized product to weakly acidic, charging the sterilized product into a container under an aseptic condition and sealing the opening of the container, and coagulating the calcium hydroxide-sucrose complex as coagulant to the soy bean milk by heating.

When the calcium hydroxide-sucrose complex used as coagulant is insufficient to provide the required extent of calcium enrichment, calcium lactate may be added in an aseptic atmosphere after the sterilization process as at the time of pH adjustment.

10 Claims, 2 Drawing Figures

METHOD OF PRODUCING CALCIUM-ENRICHED ASEPTIC SOY BEAN CURD

BACKGROUND OF THE INVENTION

1. Field of the Invention

This invention relates to a method of producing a calcium-enriched aseptic soy bean curd. More particularly, it relates to a method of producing a calcium-enriched aseptic soy bean curd in which a calcium hydroxide-sucrose complex hitherto not used as a coagulant for the soy bean curd is used for the first time as such coagulant.

2. Description of the Prior Art

Heretofore, calcium sulfate or "bittern" consisting of a mixture of magnesium chloride and magnesium sulfate, have been used as a coagulant for preparation of the soy bean curd. In recent years, the soy bean curd packaged in blow molded containers are manufactured using glucono-delta-lactone (abbreviated as the GDL) as coagulant. With these methods, however, the soy bean curd may be sterilized insufficiently and has a rather short shelf life.

In order to obviate such drawbacks, a method of producing an aseptic soy bean curd packaged in a container has been shown and described in the Japanese Patent Kokoku Nos. 56-23574 and 56-23577. According to this method, the soy bean milk is sterilized by the ultra high temperature treatment (UHT) system (for example the vacuum thermo injection system VTIS). Then, the coagulant (GDL) is added thereto under an aseptic atmosphere, the resulting product is subjected to aseptic blow molding and charged into a container, the open end of the container is sealed, and the packaged curd product is ultimately heated for coagulation. There has also been shown in the Japanese Patent Kokoku No. 56-39865 a method according to which, in the above described method, the soy bean milk is continuously and homogeneously mixed with the coagulant (GDL).

With these prior-art methods, the coagulant used (GDL) is of the type that needs to be heated to solidify the soy bean milk. As a result thereof, should the coagulant be added to the soy bean milk prior to UHT method (for example VTIS method) sterilization process, it is coagulated by the heat evolved during the sterilization process. Therefore, as a matter of course, the coagulant cannot be added to the soy bean milk prior to the sterilization process. Thus, in the aforementioned Japanese Patent Kokoku No. 56-23574, it is stated that the coagulant is added to the resulting sterilized soy bean juice or to the said sterilized soy bean milk meaning that the coagulant need be added after the sterilization process.

Addition of a large quantity of the coagulant in this manner after the sterilization process tends to pose a problem in the aseptically controlled operation of the production process. Thus a sterilizing filter such as Millipore filter as described in the aforementioned publication is required.

Also, in view of the reduced calcium intake in our present-day diet system, it has become a desideratum that a variety of foodstuffs including soy bean milk and soy bean curd be enriched with calcium. With soy bean milk, there is shown in the Japanese Patent Kokoku No. 56-50549 and the Japanese Patent Kokoku Nos. 52-90622, 53-96356 and 53-133669 the method of producing calcium-enriched soy bean milk by adding calcium gluconate or calcium hydroxide to the soy bean milk during the manufacturing process.

However, no other coagulant than GDL has been specified as coagulant in the aforementioned Japanese Patent Kokoku No. 56-23574, No. 23577 or No. 56-39865, in which no suggestion has been made for fortifying the curd with calcium. Addition of a large quantity of a coagulant such as calcium salts other than GDL after the sterilization process also presents difficulties because calcium sulfate, one of the customary coagulants for the soy bean curd, is low in solubility in water and hence cannot be added in large amounts, while calcium chloride, another customary coagulant for the soy bean curd, is coagulates only inhomogeneously and causes deteriorated flavor of the soy bean curd product. Water-soluble calcium salts, such as calcium lactate, can be added in larger quantities after the sterilization process. However, because of the larger relative weight of the lactic acid portion of the calcium lactate molecule, it has to be used in larger quantities when used for calcium fortification. Such addition of the larger quantities of calcium lactate results in a bitter astringent taste thus greatly detracting from the flavor of the soy bean curd. In addition, the product cost is increased due to the higher production cost of calcium lactate.

In this manner, in the preparation of the aseptic soy bean curd products, considerable difficulties are presented in connected with the addition of larger quantities of calcium not only in the flavor and manufacture costs but in the product quality.

SUMMARY OF THE INVENTION

It is therefore an object of the present invention to a provide a coagulation system of a completely new type according to which the coagulant is introduced in the pre-sterilization process while simultaneously the desired calcium fortification may be fulfilled.

It is a further object of the present invention to provide a method of producing a calcium-enriched aseptic soy bean curd with reduced costs and without losing the flavor.

The present invention has been made in order to achieve these objects and provides a method of producing the calcium-enriched soy bean curd which comprises introducing a calcium hydroxide-sucrose complex into the soy bean milk as coagulant, sterilizing the resulting mixture by heating, adjusting the pH value of the sterilized product to weakly acidic, charging the sterilized product into a container under aseptic conditions, sealing the opening of the container, causing the product to be coagulated by heating. And, if necessary, introducing calcium lactate as an secondary calcium source.

DESCRIPTION OF THE PREFERRED EMBODIMENTS

Figure 1:
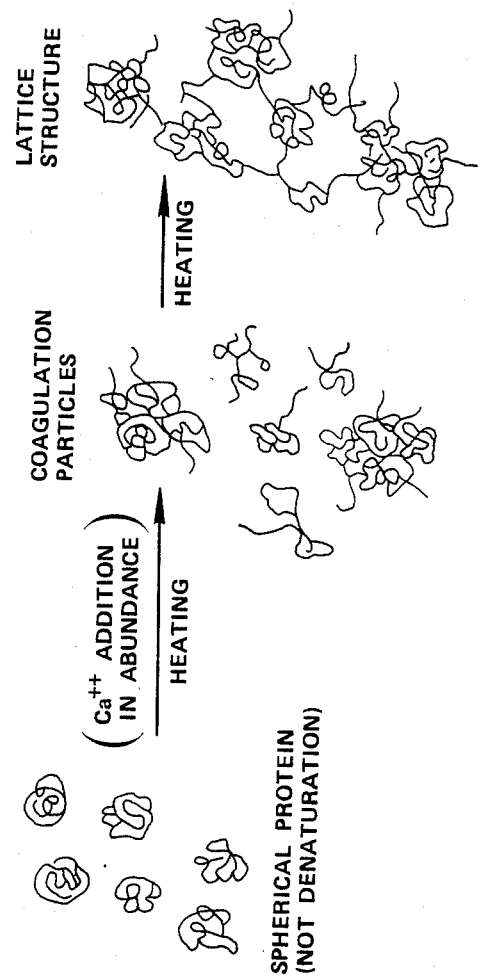
FIG. 1 is a schematic view showing the coagulated protein obtained in accordance with the present invention.

The present invention has been made in order to overcome aforementioned difficulties at a time and to provide a novel and less costly coagulation system which makes it possible to add a large quantity of the calcium-containing coagulant during the pre-sterilization process and to fortify the product with calcium without deteriorating the flavor of the product.

As a result of our investigations, it has been found that any of known thermally activated coagulants is unable to fulfil the object given above and hence it was necessary to evolve a coagulant that has a coagulation mechanism different from that of any of known coagulants, that does not cause the soy bean milk to be coagulated during sterilization and that can cause the soy bean milk to be coagulated by the simple operation of changing the state of the soy bean milk after sterilization.

Our screening tests on a variety of calcium compounds resulted in failure to find a material showing such heat-resistant properties and the ability to fortify the product with calcium and to coagulate the soy bean protein simultaneously. Then, we directed our attention to a variety of complex compounds and, as a result of further screening tests, have arrived at a calcium hydroxide-sucrose complex which is one of the complex compounds of calcium hydroxide and sugar. Our further investigations into more detailed processing conditions of the specified complex has led to completion of the present invention.

The present invention provides the method of producing the calcium-enriched aseptic soy bean curd which consists essentially in making use of the calcium hydroxide-sucrose complex as new type coagulant.

The calcium hydroxide-sucrose complex to be used in accordance with the present invention is a saccharate which is a kind of an addition product between sucrose (saccharose) and an alkali earth metal hydroxide, and may be typified by monocalcium saccharate ($C_{12}H_{21}O_{11}CaOH.H_2O$), dicalcium saccharate ($C_{12}H_{20}O_{11}.(CaOH)_2.2$ to $6H_2O$) and tricalcium saccharate ($C_{12}H_{19}O_{11}.(CaOH)_3.3$ to $6H_2O$). These complex compounds may be obtained easily by dissolving calcium hydroxide and sucrose in water and stirring the resultant mixture.

The complex compound per se has been known in the art, Jounral of the Japanese Chemical Society, 1972, No. 12, pages 2287 to 2291. However, it is not known to make use of the material in foodstuffs, to say nothing of using the material as the coagulant for the soy bean curd. That is, there lacks in literature a teaching on using the complex material as a coagulant. Thus the present invention provides the novel application of the complex compound as the coagulant. In addition, by virtue of the novel coagulation mechanism of the complex compound which is completely different from the previously known one as will be described below, there results a soy bean curd which is extremely soft and excellent in flavor. For distinction from the conventional coagulation, the coagulation achieved in accordance with the present invention is occasionally termed improved coagulation.

In practicing the present invention, a calcium hydroxide-sucrose complex is added to the soy bean juice prepared customarily, with or without the addition of magnesium sulfate and/or table salt in order to enhance the consistency or flavor.

When used singly as the calcium component, the calcium hydroxide-sucrose complex is preferably added in the product in an amount of 30 to 100 mg % as calcium. The amount lower than 30 mg % as calcium is not desirable because the curd becomes more flaccid. In case of using calcium lactate as calcium source as described later, it is preferred that the total amount of addition of the calcium hydroxide-sucrose complex and calcium lactate to the product be in the range from 50 to 100 mg % as calcium. In any case, when the amount of calcium hydroxide-sucrose complex to be added is in excess of 50 mg % as calcium, the amount of addition of sodium hexametaphosphate to the product need be in the range from 0.05 to 0.1% in order to inhibit thickening during pH adjustment. It will be noted that the addition rate of sodium hexamethaphosphate is increased linearly up to 0.05 to 0.1% for the calcium contents in the product in the range of 50 to 100 mg %. With the sodium hexametaphosphate contents higher than 0.1%, the taste of the product may be lowered.

Since the pH value of the resulting mixture tends to be on the alkaline side, it is adjusted to about 7.0 by making use of an aqueous solution of an organic acid or acids such as citric acid.

Then, the ultra high temperature sterilization process is carried out. To this end, a variety of sterilization processes may be used, such as VTIS method consisting in processing at 100° to 160° C. for 5 to 60 seconds. If necessary, magnesium sulfate or table salt may be added after the steilization results in the totality of bacteria contained in the curd and complex compound inclusive of spores being killed to provide an aseptic product showing prolonged shelf life.

It should be noted that the calcium hydroxide-sucrose complex employed in accordance with the present invention as the new type coagulant does not solidify by the high temperature sterilization process and thus in a manner totally different from the conventional coagulants that are activated upon heating, such as calcium sulfate or calcium chloride.

Then, an aqueous solution of an organic acid is added under a germ-free condition into the sterilized liquid mixture for adjusting the pH value to a weakly acidic range. This value is preferably in the range of 5.7 to 5.9. With the pH value lower than 5.7, the curd tends to be thickened and lowered in workability, while the gel structure becomes rough and suffers from increased water oozing. The pH value higher than 5.9 is not desirable because the structure tends to be softened. Any organic acids that are not detrimental to the starting materials, product or the coagulation process may be used singly or as a mixture. These acids may be typically by citric-, gluconic-, malic-, fumaric- or ascorbic acids. Above all, citric acid and ascorbic acid are preferred in view of flavor. Natural fruit juices rich in these acids may be used in place of these acids to provide for variegated flavor. Acidic fruit juices are known to lower the pH value of the soy bean milk and to cause protein sedimentation and, for this reason, addition of these fruit juices in an amount sufficient to cause their flavor to be exhibited has not been feasible with the prior-art methods. On the contrary, the present invention makes such addition possible without changing the manufacturing process.

It is also a principal object of the present invention to provide a calcium-enriched product. When the calcium hydroxide-sucrose complex used as coagulant is insufficient to provide the required extent of calcium enrichment, other calcium compounds may be added in an aseptic atmosphere after the sterilization process as at the time of pH adjustment. As the calcium compound, calcium lactate is most preferred in view of its taste.

The total amount of calcium lactate and calcium hydroxide-sucrose complex as calcium sources in the product is preferably in the range from 50 to 100 mg % (50 to 100 mg in 100 g of the product) as calcium. The total amount less than 50 mg % is not desirable because the product curd tends to be flaccid. The total amount of the calcium sources higher than 100 mg % also is not desirable because the texture tends to be rough and water oozing is also increased. The amount of calcium lactate in the calcium component of the product is preferably in the range from 15 to 30 mg % as calcium. The amount of calcium lactate in the calcium component less than 15% is not desirable because the product curd becomes more or less flaccid. The amount of calcium lactate higher than 30 mg % is also not desirable because the product curd becomes inferior in both taste and flavor.

The steps of calcium fortification and addition of an organic acid or acids are carried out in a known manner under aseptic conditions, e.g. in an aseptic processing chamber.

The product processed in this manner is charged in a container and the opening of the container is sealed tightly with use of a known equipment such as aseptic charging device. The product thus charged in the sealed container is coagulated by heating for 20 to 60 minutes by any known methods as by using a heating coagulating tank maintained at 75° to 95° C. to provide the product curd.

Figure 2:
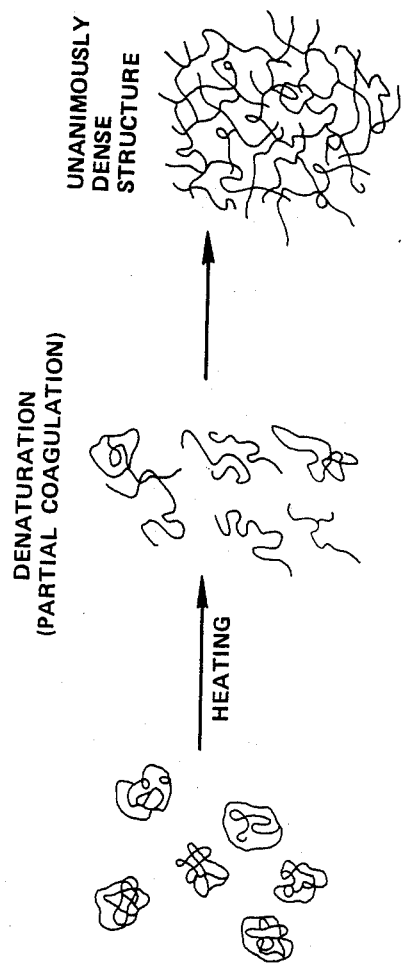
FIG. 2 is a schematic view showing the coagulated protein obtained by the conventional method.

It is an important aspect of the present invention to make use, as a new type coagulant the calcium hydroxide-sucrose complex. By using such compound, there is obtained a soy bean curd having a good taste and a highterto unprecedented soft creamy structure in contrast to the aseptic soy bean curd obtained by the conventional methods. The presence of the above described structure may be demonstrated from the results of functional tests. In addition, formation of such structure may be explained by the fact that the protein particles when heated in the presence of a larger amount of calcium are flocculated to larger size particles each composed of several particles found together, thus a loose lattice structure is formed from a number of these larger size particles, as schematically shown in FIG. 1, see J. Food Sci. 43, 79 (1978). In contrast thereto, referring to the schematic view of FIG. 2, the structure of the soy bean curd shown therein and obtained by the conventional methods consists of numerous protein particles bound together with a narrow interval between adjacent particles without several particles being previously flocculated together to larger size particles, thus giving rise to densely packed aggregates of protein particles instead of the soft flaccid structure attainable with the present invention.

In light of the above, the coagulation system of the present invention is totally different from the conventional system. Although not clarified precisely at present, the mechanism may be explained as follows. Under the high temperature sterilizing conditions in the vicinity of neutral pH value, the calcium hydroxide-sucrose complex is in the state of a chelate compound with the calcium not being ionized and hence less likely to react with protein, so that lability and deterioration in heat resistance of the protein in the presence of calcium is avoided. It is further estimated that, as the pH value is lowered, the complex material is broken up at this stage with resultant calcium ionization and contact with protein thus causing protein coagulation and the phenomenon termed herein as improved coagulation.

From the foregoing it is seen that the present invention provides an industrially useful method for the preparation of the aseptic soy bean curd having an extremely soft and mild taste and a creamy appearance by making use of a calcium complex as new type coagulant. In addition, the aseptic soy bean curd of the present invention can be fortified with calcium to 4 to 5 times that of the soy bean curd obtained by the conventional method by simultaneously making use of calcium lactate as secondary calcium source.

In this manner, the present invention provides for simultaneous attainment of the outstanding results such as calcium fortification, soft, creamy and good flavor, cost reduction and prolonged shelf life.

The description with reference to the preferred example of the present invention is given hereinbelow. It should be noted that the Examples are given only by way of illustration and are not intended for limiting the scope of the invention.

EXAMPLE 1

To 2400 kg of soy bean milk were added 71 kg of calcium hydroxide-sucrose complex solution, 30 kg of 10% saline water and 30 kg of 5% sodium hexametaphosphate solution. To the resulting mixture were further added 81 kg of 10% - aqueous solution of citric acid and 170 kg of water for forcing the soy bean milk through the pipeline. The pH value of the resulting mixture was adjusted to 7.1.

With use of the VTIS device manufactured by Alfalaval Inc., the resulting mixture was subjected to a high temperature sterilizing treatment for 30 seconds at 140° C. by the VTIS method, followed by cooling and further mixing with 36 kg of 10% - aqueous solution of citric acid. The pH value of the resulting mixture was then adjusted to 5.75.

Then, with use of the aseptic charging device manufactured by Tetra Pack Co., the mixture was conventionally charged into a container under germ-free conditions as the opening of the container was sealed. The product thus obtained was charged into a heating and coagulating tank and coagulated by treatment at 85° C. for 40 minutes to give the product soy bean curd.

The resulting curd formed a highly satisfactory gel with less water oozing and with a mild creamy texture. The calcium contents in the product amounted to 100 mg % as calcium so that the curd provided to be an excellent calcium-enriched foodstuff.

It is noted that the soy bean milk used in the present Example is composed of 12.0 percent of total solid contents, 5.8 percent of protein and 30 mg % as calcium, and the solution of the calcium hydroxide-sucrose complex is a solution in 43.0 ky of water of 5.0 kg of calcium hydroxide and 23.3 kg of succrose.

EXAMPLE 2

To 2400 kg of the soy bean milk having the same composition as that used in Example 1 were added 24 kg of solution of the calcium hydroxide-sucrose complex and 30 kg of the 10%—saline water. The resulting mixture was further mixed with 18.8 kg of 10%—aqueous solution of citric acid and 200 kg of water and the resulting product was adjusted to a pH value of 7.0.

Then, with use of the VTIS device manufactured by Alfalaval Inc., the product was subjected at 140° C. for 30 seconds to a high temperature sterilization process by the VTIS method, followed by cooling and further mixing with mixture consisting of 60 kg of 5%—aqueous solution of calcium lactate, 65 kg of 10%—aqueous solution of citric acid and 200 kg of water under an aseptic atmosphere to give a mixture having a pH value equal to 5.8. Then, 6.0 kg of water were added to the mixture.

The resulting product was charged into a container under aseptic conditions by use of the aseptic system manufactured by Tetra Pack Co., and the opening of the container was sealed. The resulting product was charged into a heating and coagulating tank and coagulated at 85° C. for 40 minutes to a product curd. The resulting curd presented a mild and creamy texture with less water oozing similarly to the product obtained in Example 1. The total calcium contents in the product amounted to 90 mg % thus showing that the product is also excellent as a calcium-enriched foodstuff.

It will be noted that the solution of calcium hydroxide-sucrose complex is obtained by dissolving in 14.67 kg of water of 1.67 kg of calcium hydroxide and 7.66 kg of sucrose, by mixing under controlled agitation.

What is claimed is:

1. A method of producing calcium-enriched aseptic soy bean curd comprising the steps of
    adding calcium saccharate as coagulant in an amount of 30 to 100 mg % as a calcium to soy bean milk to form a mixture;
    sterilizing the mixture of the soy bean milk and the calcium saccharate by heating;
    adjusting the pH value of the sterilized mixture in the range of 5.7 to 5.9;
    charging the sterilized mixture into an open container under an aseptic condition and sealing the opening of the container;
    and heating the sterilized mixture in the container for 20 to 60 minutes at a temperature of 75° to 95° C., whereby said mixture is coagulated by said calcium saccharate.

2. A method according to claim 1 wherein the pH adjustment is performed by the aseptic addition of organic acid.

3. A method according to claim 2 wherein the organic acid is citric acid or ascorbic acid.

4. A method according to claim 3 wherein the citric acid or ascorbic acid is added in the form of natural fruit juices.

5. A method of producing a calcium-enriched aseptic soy bean curd comprising the steps of
    adding calcium saccharate as a coagulant to soy bean milk in an amount of 30 to 100 mg % as calcium to form a mixture;
    sterilizing the mixture of the soy bean milk and the calcium saccharate by heating;
    adding calcium lactate as an additional calcium source for calcium fortification to the sterilized mixture in an amount of 15 to 30 mg %;
    adjusting the pH value of the sterilized mixture in the range of 5.7 to 5.9;
    charging the sterilized mixture into an open container under an aseptic condition and sealing the opening of the container;
    and heating the sterilized mixture in the container for 20 to 60 minutes at a temperature of 75° to 95° C., whereby said mixture is coagulated by said calcium saccharate.

6. A method according to claim 5 wherein the amount of calcium saccharate and calciuim lactate added to the soy bean curd is 50 to 100 mg % as calcium.

7. A method according to claim 5 wherein the pH adjustment is performed by the aseptic addition of organic acid.

8. A method according to claim 7 wherein the organic acid is citric acid or ascorbic acid.

9. A method according to claim 8 wherein the citric acid or ascorbic acid is added in the form of natural fruit juices.

10. A method according to claim 1 or claim 5 comprising the additional step of adding sodium hexametaphosphate in an amount of 0.05 to 0.1% to the soy bean curd when the amount of addition of the calcium saccharate is higher than 50 mg % as calcium.

* * * * *